United States Patent
Yamamoto

(10) Patent No.: US 8,542,937 B2
(45) Date of Patent: Sep. 24, 2013

(54) IMAGE PROCESSING APPARATUS, IMAGE PROCESSING METHOD, COMPUTER PROGRAM, AND INFORMATION STORAGE MEDIUM

(75) Inventor: Hideaki Yamamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1685 days.

(21) Appl. No.: 12/000,383

(22) Filed: Dec. 12, 2007

(65) Prior Publication Data

US 2008/0152261 A1 Jun. 26, 2008

(30) Foreign Application Priority Data

Dec. 22, 2006 (JP) .................................. 2006-346078

(51) Int. Cl.
*G06K 9/46* (2006.01)
(52) U.S. Cl.
USPC .............................. 382/239; 345/619; 358/1.9
(58) Field of Classification Search
USPC ................... 382/180, 239; 345/619; 358/1.9
See application file for complete search history.

(56) References Cited

U.S. PATENT DOCUMENTS

| | | | | |
|---|---|---|---|---|
| 5,706,216 A | * | 1/1998 | Reisch | 708/203 |
| 5,923,828 A | * | 7/1999 | Yagishita | 358/1.17 |
| 5,956,425 A | * | 9/1999 | Yoshida | 382/234 |
| 6,603,884 B2 | * | 8/2003 | Matsuura et al. | 382/248 |
| 6,731,400 B1 | * | 5/2004 | Nakamura et al. | 358/1.9 |
| 7,046,387 B1 | * | 5/2006 | Yagishita et al. | 358/1.16 |
| 7,050,644 B2 | * | 5/2006 | Juri et al. | 382/247 |
| 7,529,419 B2 | * | 5/2009 | Yoshida | 382/239 |

FOREIGN PATENT DOCUMENTS

JP 2006-237858 9/2006

* cited by examiner

*Primary Examiner* — Aaron W Carter
(74) *Attorney, Agent, or Firm* — Harness, Dickey & Pierce, P.L.C.

(57) ABSTRACT

An image processing apparatus is disclosed that includes a characteristics acquisition unit that acquires characteristics of a picture image; a format selection unit that selects the format of image data depending on the processing time for restoring the picture image based on the characteristics; and a format conversion unit that converts the format of the image data into that selected by the format selection unit.

15 Claims, 7 Drawing Sheets

IMAGE PROCESSING APPARATUS, IMAGE PROCESSING METHOD, COMPUTER PROGRAM, AND INFORMATION STORAGE MEDIUM

BACKGROUND OF THE INVENTION

1. Field of the Invention

The present invention relates to an image processing apparatus, an image processing method, a computer program, and an information storage medium.

2. Description of the Related Art

Conventionally, there has been employed a technique in which the format of image data is mutually converted between a vector data format and a raster data format. For example, JP-A-2006-237858 (Patent Document 1) discloses an image processing method in which the format of image data is converted from the raster data format to the vector data format when embedded information is embedded in an image, and after it is embedded in vector data, the format of the image data is converted into the raster data format again.

Meanwhile, the raster data format or a bit-mapped data format sets a color value for each pixel. On the other hand, the vector data format is represented as a group of the parameters of an equation of coordinates at points, lines, and surfaces for connecting the coordinates to each other as well as imaging information such as filling and special effects. Therefore, it is desired to select a suitable format depending on the characteristics of an image, the processing method thereof, the specifications of an image processing apparatus, or the like.

For example, the time required for processing is different between a personal computer having a high-speed CPU and sufficient memory and an embedded device having a CPU and memory inferior in performance to those of the personal computer even if they attempt to display the same image. Therefore, if the device has low performance for processing image data, selecting a format requiring less time for displaying a picture image makes it possible to provide a suitable display for an operator.

Patent Document 1: JP-A-2006-237858

SUMMARY OF THE INVENTION

Although the image processing method of Patent document 1 and the like describes the conversion of the format of image data, it does not disclose the selection of the format in accordance with the device that processes the image data or the like.

The present invention has been made in view of the above point to solve the problem and may provide an image processing apparatus that selects the format of image data depending on the processing time for restoring a picture image so as to provide a suitable display for an operator.

In order to attain the above object, the image processing apparatus according to the embodiment of the present invention employs the following configuration.

The image processing apparatus according to the embodiment of the present invention may comprise a characteristics acquisition unit that acquires characteristics of a picture image; a format selection unit that selects a format of image data depending on a processing time for restoring the picture image based on the characteristics; and a format conversion unit that converts the format of the image data into the format selected by the format selection unit.

Accordingly, selecting the format of the image data depending on the processing time for restoring the picture image makes it possible to provide an image processing apparatus that provides a suitable display for an operator.

Furthermore, in order to attain the above object, the image processing apparatus according to the embodiment of the present invention may be such that the format selection unit selects either a raster data format or a vector data format.

Accordingly, it is possible to provide an image processing apparatus that selects either the raster data format or the vector data format depending on the processing time for restoring the picture image.

Furthermore, in order to attain the above object, the image processing apparatus according to the embodiment of the present invention may further comprise an image generation unit that generates the picture image from input image data; and an image division unit that divides the picture image into plural areas based on the characteristics of the picture image. In the image processing apparatus, the characteristics acquisition unit acquires the characteristics of the picture image of each of the areas, the format selection unit selects the format of the image data for each of the areas, and the format conversion unit converts the format of the image data for each of the areas.

Accordingly, selecting the format of the image data for each of the areas of the picture image corresponding to the input image data depending on the processing time for restoring the picture image makes it possible to suitably display the picture image corresponding to the input image data.

Furthermore, in order to attain the above object, the image processing apparatus according to the embodiment of the present invention may be such that the image division unit acquires layout information of the picture image corresponding to the input image data. The image processing apparatus may further comprise a layout information holding unit that holds the layout information; an image data holding unit that holds the image data of each of the areas converted by the format conversion unit; an image restoration unit that restores the picture image of each of the areas from the image data held by the image data holding unit; and an input image restoration unit that restores the picture image corresponding to the input image data based on the picture image of each of the areas and the layout information.

Accordingly, acquiring the layout information of the picture image corresponding to the input image data makes it possible to use the layout information at the time of restoring the picture image.

Furthermore, in order to attain the above object, the image processing apparatus according to the embodiment of the present invention may further comprise a display unit that displays the picture image restored by the input image restoration unit.

Accordingly, it is possible to suitably display the picture image corresponding to the input image data.

Furthermore, in order to attain the above object, the image processing apparatus according to the embodiment of the present invention may further comprise an orthogonal transformation unit that applies orthogonal transformation to the picture image. In the image processing apparatus, the format selection unit predicts the processing time based on transformation coefficients generated by the orthogonal transformation unit.

Accordingly, the characteristics of the transformation coefficients generated by the orthogonal transformation unit make it possible to predict the processing time for restoring the picture image.

Furthermore, in order to attain the above object, the image processing apparatus according to the embodiment of the present invention may be such that the orthogonal transformation unit applies the orthogonal transformation to each of plural blocks in the picture image divided into the blocks, and the format selection unit predicts the processing time based on values of the transformation coefficients higher than a given order from among the transformation coefficients of the blocks.

Accordingly, predicting the processing time based on the average of the values of high transformation coefficients from among those of the blocks makes it is possible to suitably select the format.

Furthermore, in order to attain the above object, the image processing apparatus according to the embodiment of the present invention may further comprise a compression unit that compresses the image data based on the transformation coefficients generated by the orthogonal transformation unit.

Accordingly, the common use of the orthogonal transformation unit by both the characteristics acquisition unit and the compression unit makes it possible to simplify the configuration of the image processing apparatus as a whole.

Furthermore, in order to attain the above object, the image processing method according to the embodiment of the present invention may comprise a characteristics acquisition step of acquiring characteristics of a picture image; a format selection step of selecting a format of image data depending on a processing time for restoring the picture image based on the characteristics; and a format conversion step of converting the format of the image data into the format selected in the format selection step.

Furthermore, in order to attain the above object, the image processing method according to the embodiment of the present invention may be such that the format selected in the format selection step is either a raster data format or a vector data format.

Furthermore, in order to attain the above object, the image processing method according to the embodiment of the present invention may further comprise an image generation step of generating the picture image from input image data; and an image division step of dividing the picture image into plural areas based on the characteristics of the picture image. In the image processing method, the characteristics of the picture image of each of the areas are acquired in the characteristics acquisition step, the format of the image data for each of the areas is selected in the format selection step, and the format of the image data for each of the areas is converted in the format conversion step.

Furthermore, in order to attain the above object, the image processing method according to the embodiment of the present invention may be such that layout information of the picture image corresponding to the input image data is acquired in the image division step. The image processing method may further comprise an image restoration step of restoring the picture image of each of the areas from the image data of the corresponding area converted in the format conversion step; and an input image restoration step of restoring the picture image corresponding to the input image data based on the picture image of each of the areas and the layout information.

Furthermore, in order to attain the above object, the image processing method according to the embodiment of the present invention may further comprise a display step of displaying the picture image restored in the input image restoration step.

Furthermore, in order to attain the above object, the image processing method according to the embodiment of the present invention may further comprise an orthogonal transformation step of applying orthogonal transformation to the picture image. In the format selection step, the processing time is predicted based on plural transformation coefficients generated in the orthogonal transformation step.

Furthermore, in order to attain the above object, the image processing method according to the embodiment of the present invention may be such that the orthogonal transformation is applied to each of plural blocks in the picture image divided into the blocks in the orthogonal transformation step, and the format of the image data is selected based on values of the transformation coefficients higher than a given order from among the transformation coefficients of the blocks in the format selection step.

Furthermore, in order to attain the above object, the image processing method according to the embodiment of the present invention may further comprise a compression step of compressing the image data based on the transformation coefficients generated in the orthogonal transformation step.

Furthermore, in order to attain the above object, the computer program according to the embodiment of the present invention may cause a computer to perform the above image processing method.

Furthermore, in order to attain the above object, the information storage medium according to the embodiment of the present invention may be a computer-readable information storage medium having the above computer program stored therein.

The embodiment of the present invention makes it possible to provide the image processing apparatus that selects a format of image data depending on the processing time for restoring a picture image so as to provide a suitable display for an operator.

DETAILED DESCRIPTION OF THE PREFERRED EMBODIMENTS

Next, a description is made of an example of the present invention based on the accompanying drawings.

(First Embodiment)

(Diagram Showing Configuration Example of Network Including Image Processing Apparatus According to Embodiment of the Present Invention)

Figure 1:
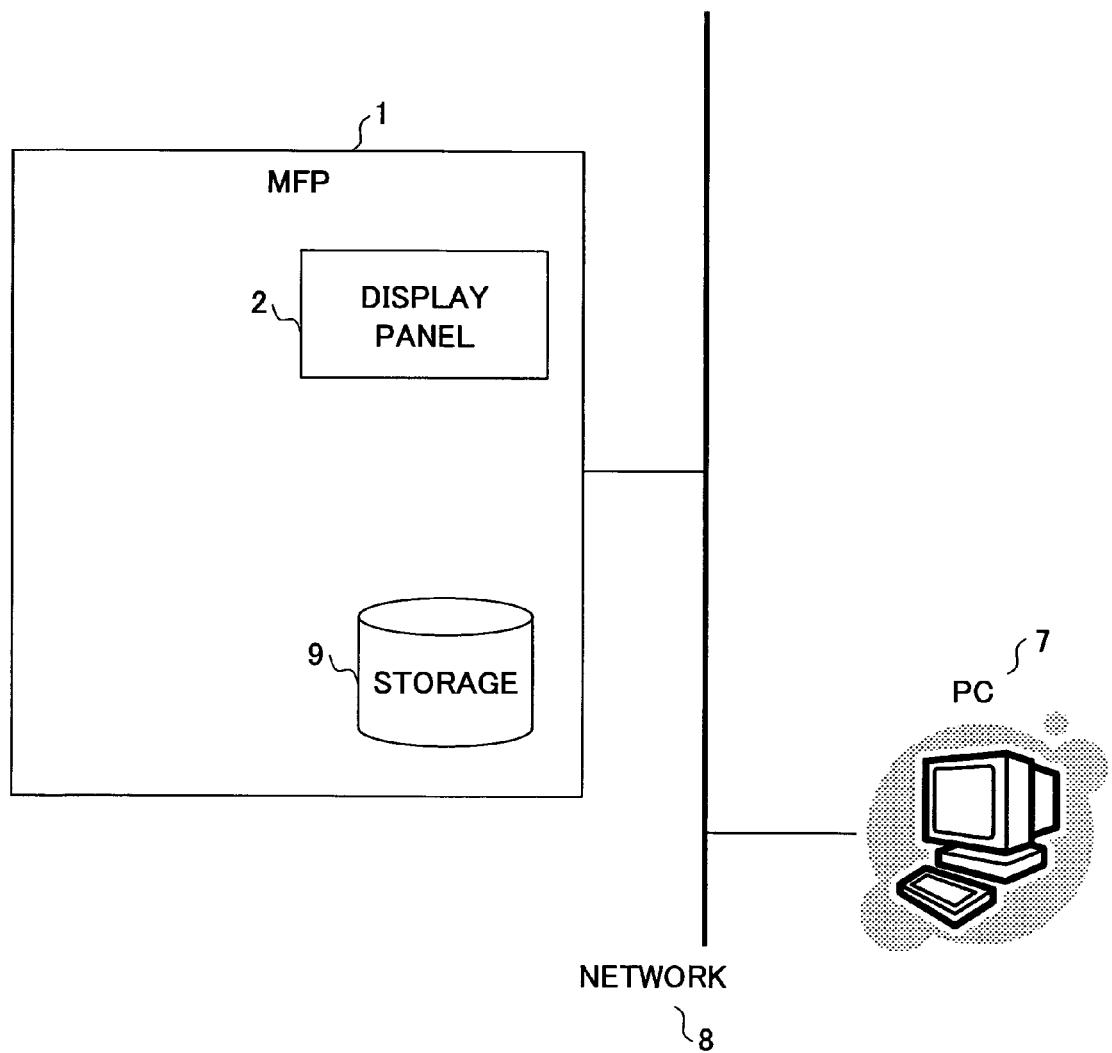
FIG. 1 is a diagram showing a configuration example of a network including an image processing apparatus according to an embodiment of the present invention.

FIG. 1 is a diagram showing a configuration example of a network including a multi-function peripheral (hereinafter referred to as "MFP") as an image processing apparatus according to an embodiment of the present invention. In FIG.

1, the MFP 1 is connected to a personal computer (hereinafter referred to as "PC") 7 through a network 8.

The MFP 1 includes a display panel 2 as a user interface (hereinafter referred to as "I/F") and a storage device 9. The display panel 2 displays the processing status of the MFP 1 and includes an input unit through which an operator provides instructions or the like to the MFP 1. The PC 7 outputs instructions on jobs to the MFP 1. Furthermore, the PC 7 has a display device where the status of the MFP 1 is to be displayed.

The operator, a manager, or the like of the MFP 1 or the PC 7 transmits the image data of an image to be displayed on the display panel 2 of the MFP 1 from the PC 7 to the MFP 1. The MFP 1 converts the transmitted image data into a given format and stores it in the storage device 9. Moreover, the MFP 1 generates a picture image from the image data stored in the storage device 9 and displays it on the display panel 9 in accordance with the progress of a job.

(Diagram Showing Functional Configuration Example of Image Processing Apparatus According to Embodiment of the Present Invention)

Figure 2:
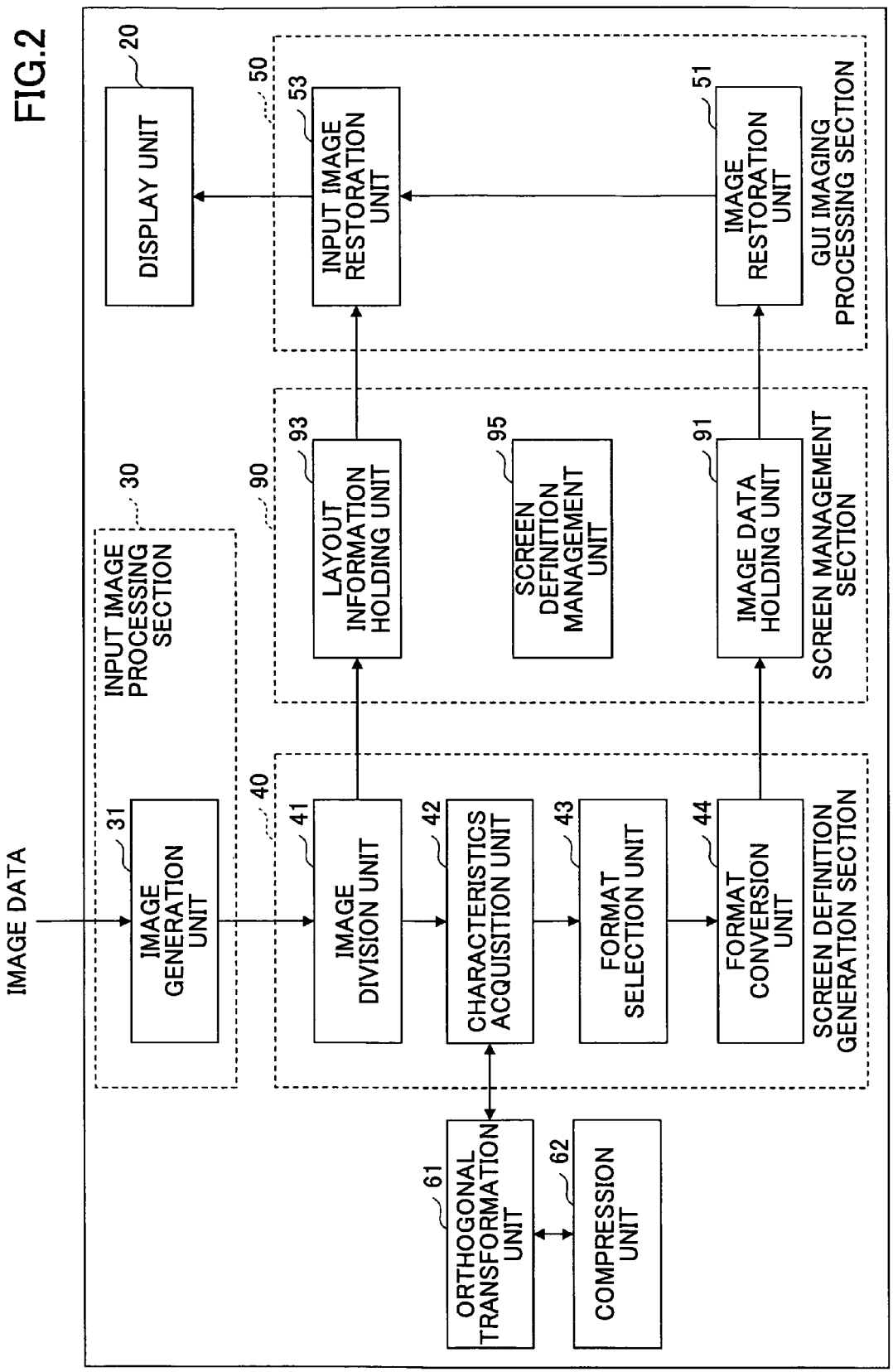
FIG. 2 is a diagram showing a functional configuration example of the image processing apparatus according to an embodiment of the present invention.

FIG. 2 is a diagram showing a functional configuration example of the MFP 1 as the image processing apparatus according to an embodiment of the present invention. The MFP 1 of FIG. 2 includes a screen definition generation section 40. The MFP 1 may further include a display unit 20, an input image processing section 30, a screen management section 90, a graphical user interface (hereinafter referred to as "GUI") imaging processing section 50, and an orthogonal transformation unit 61 or a compression unit 62.

The screen definition generation section 40 analyzes the picture image corresponding to the image data input to the MFP 1 to obtain screen definition information. The screen definition information refers to information including image data corresponding to one or plural picture images and layout information for arranging them on a screen. The screen definition information may be, for example, in the form of Macromedia Flash SWF files.

The screen definition generation section 40 includes the characteristics acquisition unit 42, a format selection unit 43, and a format conversion unit 44. The screen definition generation section 40 may further include an image division unit 41.

The image division unit 41 divides a picture image corresponding to the image data input to the MFP 1 into plural areas. The image division unit 41 divides the picture image into the plural areas, for example, by detecting a group of pixels having a given color. Note that if the input image data have plural areas according to a meta-data format such as XML, the image division unit 41 may divide the plural areas based on the meta-data or the like.

The picture image of each area divided by the image division unit 41 is input to the characteristics acquisition unit 42. On the other hand, the layout information as arrangement information on the area acquired by the image division unit 41 is input to and held by a layout information holding unit 93.

The characteristics acquisition unit 42 acquires the characteristics of the picture image of each area divided by the image division unit 41. The characteristics acquisition unit 42 decomposes the frequency of the image, for example, by applying orthogonal transformation to the picture image and acquires the characteristics of the picture image based on the obtained transformation coefficient. Note that the orthogonal transformation may be performed by the orthogonal transformation unit 61.

The format selection unit 43 selects a format corresponding to the image data depending on the processing time for restoring the picture image based on the characteristics of the picture image acquired by the characteristics acquisition unit 42. The format selection unit 43 selects either a raster data format or a vector data format. Note that the raster data format may be replaced by a bit-mapped data format.

The format conversion unit 44 converts the image data into the format selected by the format selection unit 43. The format conversion unit 44 vectorizes the picture image if the selected format is the vector data format. Furthermore, if the selected format is the raster data format, the format conversion unit 44 converts the picture image into the raster data format by adding given additional information, for example, image size information, to the picture image. Note that the raster data format may be replaced by a bit-mapped data format.

The screen management section 90 holds and manages the picture image corresponding to the input image data as screen definition information by making the image data of each area and the layout information, which are generated by the screen definition generation section 40, correspond to each other. The screen management section 90 includes an image data holding unit 91 and a layout information holding unit 93. The screen management section 90 may further include a screen definition management unit 95.

The image data holding unit 91 holds the format-converted image data converted by the format conversion unit 44, and the layout information holding unit 93 holds the layout information acquired by the image division unit 41.

The screen definition management unit 95 manages the image data of each area held by the image data holding unit 91 and the layout information held by the layout information holding unit 93 by making them correspond to each other.

The GUI imaging processing section 50 generates, for example, the picture image displayed by the MFP 1. Furthermore, the picture image generated by the GUI imaging processing section 50 may be displayed on the display device controlled by the PC 7 connected through the network 8.

The GUI imaging processing section 50 may acquire the image data of each area and the layout information by requesting the screen definition information of a given screen from the screen definition management unit 95. The GUI imaging processing section 50 includes an image restoration unit 51 and an input image restoration unit 53.

The image restoration unit 51 generates the picture image from the image data held by the image data holding unit 91. The image restoration unit 51 develops the image data as the picture image based on the size information or the like included in the image data if the format of the image data is the raster data format. Furthermore, if the format of the image data is the vector data format, the image restoration unit 51 generates the picture image based on the parameters of an equation of coordinates at points, lines, and surfaces for connecting the coordinates to each other as well as imaging information such as filling and special effects, which are included in the image data. The vector data format may further include so-called run length data that represent the continuity of pixels and their values when the picture image is raster-scanned.

The input image restoration unit 53 generates the picture image corresponding to the input image data based on the picture image of each area restored by the image restoration unit 51 and the layout information held by the layout information holding unit 93.

The input image processing section 30 generates the picture image corresponding to the input image data. The picture image generated by the input image processing section 30 is identical with or substantially identical with the picture image restored by the input image restoration unit 53.

The input image processing section 30 includes an image generation unit 31. The image generation unit 31 generates the picture image from the input image data and outputs it to the image division unit 41.

The display unit 20 displays the picture image restored by the input image restoration unit 53. The display unit 20 may realize, for example, the function of Macromedia Flash Player that reproduces image data as picture images in cooperation with the GUI imaging processing section 50.

The orthogonal transformation unit 61 applies orthogonal transformation to the picture image, and the compression unit 62 compresses the image data to reduce their data amount. The common use of the orthogonal transformation unit 61 by both the characteristics acquisition unit 42 and the compression unit 62 makes it possible to simplify the configuration of the MFP 1.

Note that the orthogonal transformation performed by the orthogonal transformation unit 61 refers to discrete cosine transformation or wavelet transformation.

(Sequence Diagram Showing Example of Processing in Which Screen Definition Information is Generated)

Figure 3:
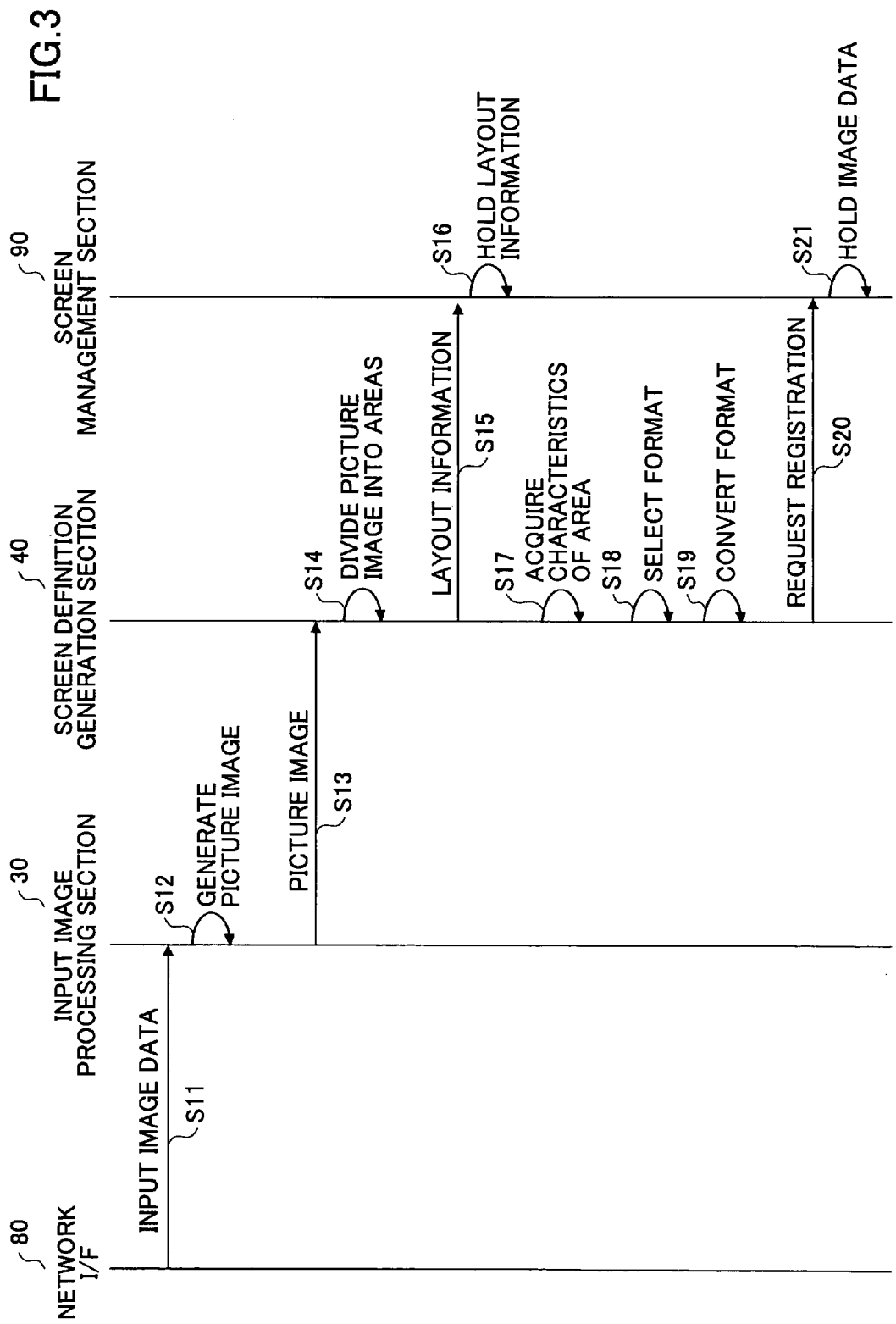
FIG. 3 is a sequence diagram showing an example of processing in which screen definition information is generated.

FIG. 3 is a sequence diagram showing a processing example until the screen definition information is generated from the image data input to the MFP 1. In step S11 of FIG. 3, a network I/F 80 outputs the image data received from the PC 7 to the input image processing section 30. Step S11 is followed by step S12 where the image generation unit 31 of the input image processing section 30 develops the image data to generate a picture image. Step 12 is followed by step S13 where the input image processing section 30 outputs the picture image generated in step S12 to the screen definition generation section 40.

Step S13 is followed by step S14 where the image division unit 41 of the screen definition generation section 40 divides the picture image into areas based on its characteristics. In this step, the picture image of each area is acquired from the input picture image, and layout information as arrangement information on the picture image of each area is also acquired.

Step S14 is followed by step S15 where the screen definition generation section 40 outputs the layout information acquired in step S14 to the screen management section 90. Step S15 is followed by step S16 where the layout information holding unit 93 of the screen management section 90 stores and holds the layout information input in step S15.

Following step S16 or before and after step S15, the process proceeds to step S17 where the characteristics acquisition unit 42 of the screen definition generation section 40 acquires the characteristics of the picture image for each area divided in step S14. The characteristics of the picture image may be acquired, for example, by applying orthogonal transformation to the picture image and decomposing the frequency of the same.

Step S17 is followed by step S18 where the format selection unit 43 of the screen definition generation section 40 selects a format corresponding to the image data depending on the processing time for restoring the picture image based on the characteristics of the picture image of each area acquired in step S17. The format to be selected here is either the raster data format or the vector data format.

Step S18 is followed by step S19 where the format conversion unit 44 of the screen definition generation section 40 converts the format of the image data of each area into that selected in step S18.

Step S19 is followed by step S20 where the format conversion unit 44 outputs the image data whose format is converted in step S19 to the screen management section 90. Step S20 is followed by step S21 where the image data holding unit 91 of the screen definition generation section 40 stores and holds the image data input in step S20.

Note that the layout information output in step S15 and the image data output in step S20, both of which are output from the screen definition generation section 40 to the screen management section 90, may be output in one step of the processing. For example, the processing may be configured in such a manner that the layout information and the image data are output to the screen definition management unit 95 and then the layout information is held by the layout information holding unit 93 and the image data of each area are held by the image data holding unit 91 in step S20.

Through the above processing from step S11 to step S21, the screen definition information is generated from the image data input in the MFP 1 and then held.

(Description of Processing by Characteristics Acquisition Unit 42)

Figure 4:
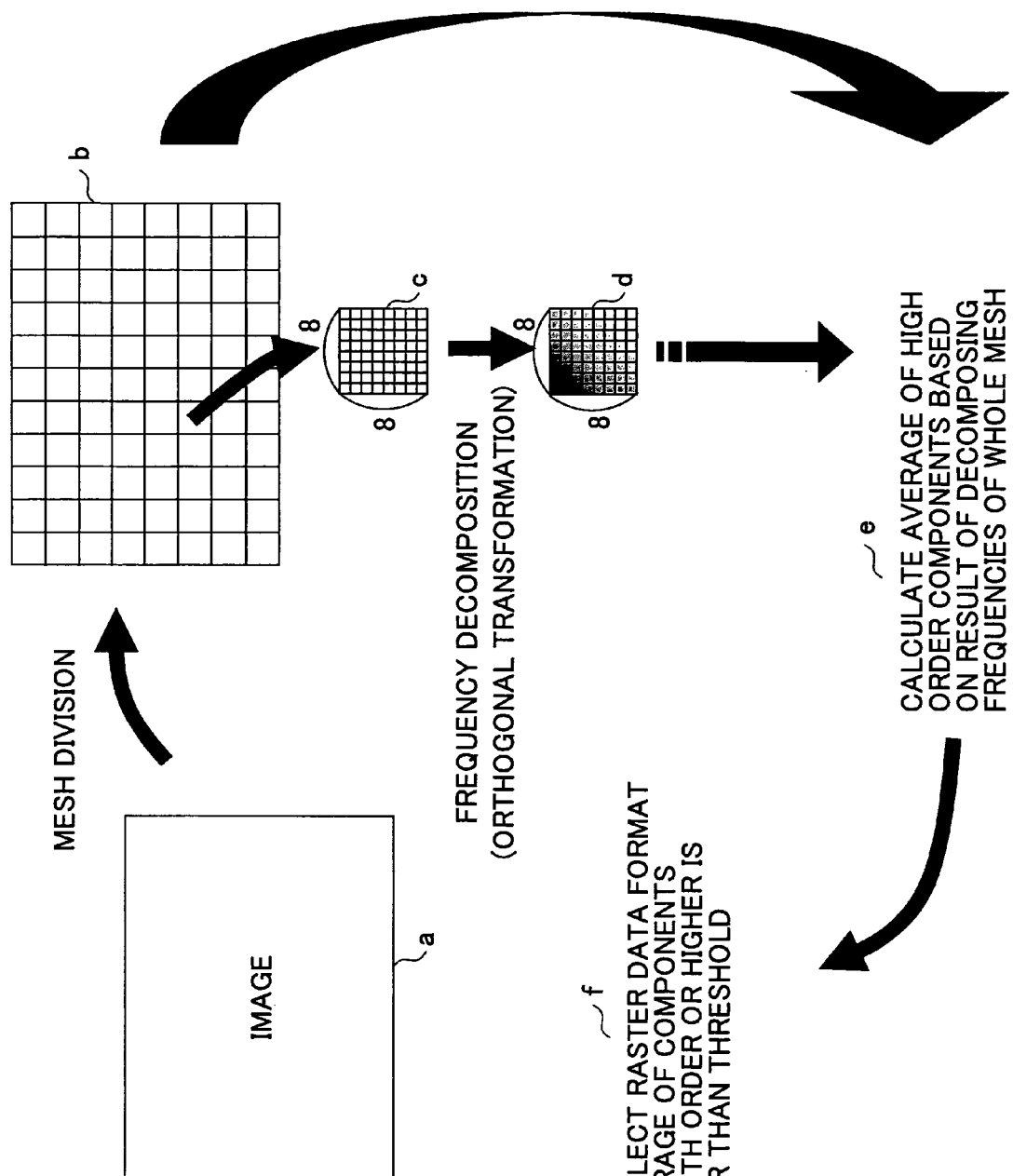
FIG. 4 is a schematic view showing a processing example by a characteristics acquisition unit 42 and a format selection unit 43.
Figure 5:
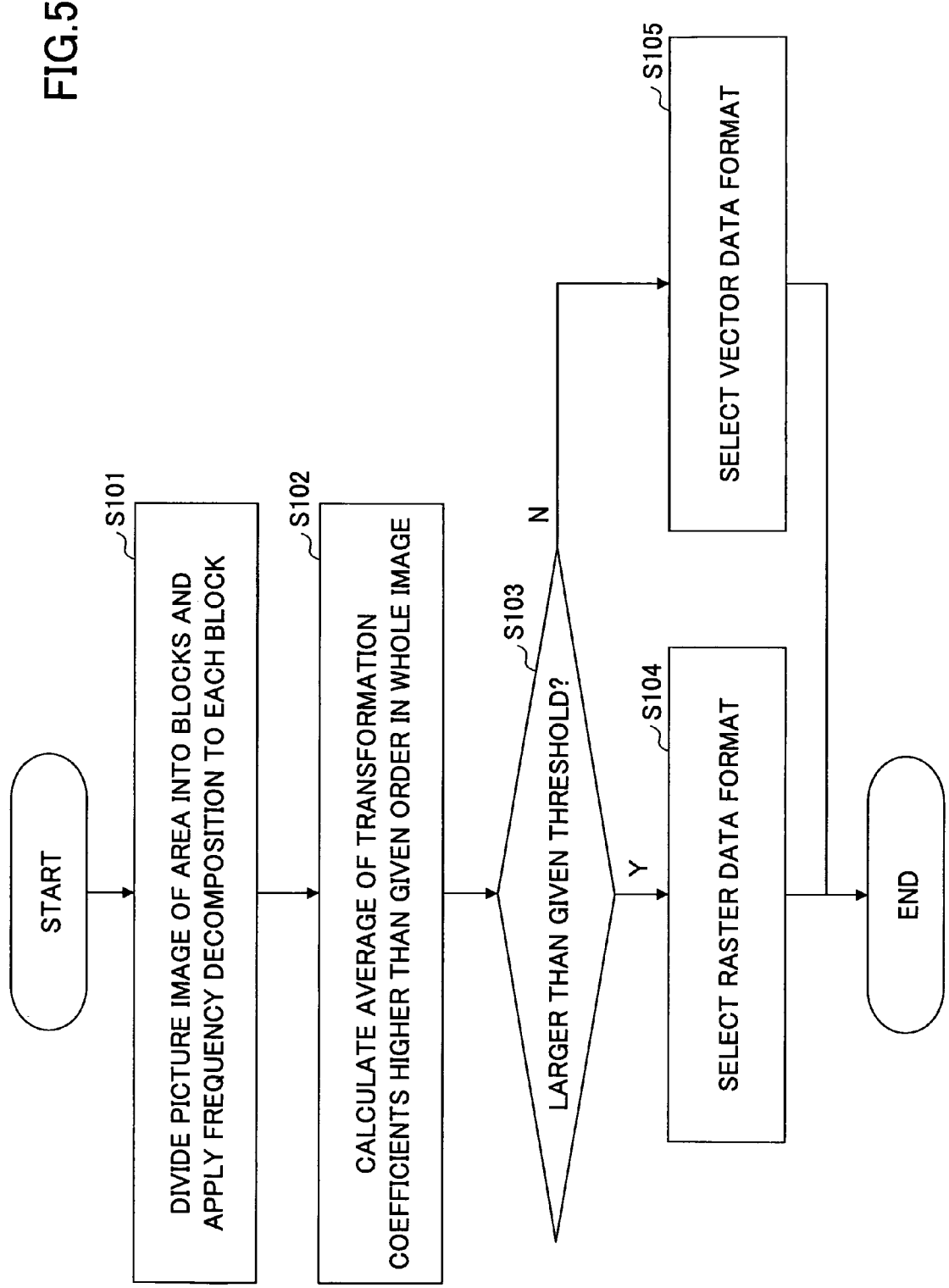
FIG. 5 is a flowchart showing a processing example by the characteristics acquisition unit 42 and the format selection unit 43.

FIGS. 4 and 5 show a processing example by the characteristics acquisition unit 42 and the format selection unit 43. FIG. 4 is a schematic view of the processing example and FIG. 5 is a flowchart thereof.

In FIG. 4, the image "a" shows the picture image of each area divided by the image division unit 41. The characteristics acquisition unit 42 divides the image "a" into blocks. Note that dividing the image into blocks is represented as "mesh division" in FIG. 4. The image "b" shows a picture image in which the image "a" is divided into blocks. Moreover, the block "c" is one of the blocks constituting the image "b" and has a size of eight pixels high by eight pixels wide.

The block "d" is a block resulting from the application of orthogonal transformation by the orthogonal transformation unit 61 to the block "c" for frequency decomposition, which is directed by the characteristics acquisition unit 42. As a result of the orthogonal transformation, the block "c" is decomposed into a high frequency component such as an edge and a flat low frequency component in which pixel values vary less.

Then, in the process "e," the characteristics acquisition unit 42 calculates the average of the values of transformation coefficients higher than a given order with respect to all the blocks of the image "b." For example, the average of the values of the transformation coefficients higher than the ninth order, namely, the transformation coefficients equal to or higher than the tenth order are calculated based on the following formula (1). Note that the given order refers to the ninth order or orders from third through tenth.

[Formula 1]

$$\frac{\sum_{n=k}^{M}\sum^{N}\alpha_n\cos(\omega t)}{\{N-(k-1)\}\times M} \quad (1)$$

where

M represents the total number of blocks in the picture image of each area, N represents the number of transformation coefficients in one block, k represents the number obtained by adding one to a given order, and $\alpha_n\cos(\omega t)$ represents a transformation coefficient.

In the process "f," the format selection unit 43 compares the average calculated in the process "e" with a given threshold. The format selection unit 43 selects the raster data format if the average is larger than the threshold and selects the vector data format if the average is equal to or smaller than the threshold.

Note that the orthogonal transformation may be performed by the orthogonal transformation unit 61. Moreover, the common use of the orthogonal transformation unit 61 by both the characteristics acquisition unit 42 and the compression unit 62 makes it possible to simplify the configuration of the MFP 1. For example, if the MFP 1 has a compression unit according to a JPEG (ISO/IEC 10918-1) method, it performs the frequency decomposition with the discrete cosine transformation used in JPEG. Furthermore, if the MFP 1 has a compression unit according to a JPEG 2000 (ISO/IEC 15444-1) method, it performs the frequency decomposition with the wavelet transformation used in JPEG 2000.

Moreover, where the orthogonal transformation unit 61 performs the frequency decomposition with respect to the whole image "a," it does not divide the image into blocks as shown in the image "b." Accordingly, this makes it possible to acquire the characteristics of the image "a" more accurately than the method of FIG. 4 in which the characteristics of the whole image is calculated from the characteristics of each block.

In the example of FIG. 4, the format of the image data is selected according to either a case where the high frequency component average is larger or a case where the low frequency component average is larger, based on the transformation coefficients obtained by the application of the frequency decomposition to the picture image. In other words, this is because the image data of the raster data format require more processing time for restoring the picture image if the high frequency component average is larger in amount, while the image data of the vector data format require less processing time for restoring the picture image if the low frequency component average is larger in amount.

Note that the processing time for restoring the picture image refers, for example, to the required time so that the image restoration unit 51 restores the picture image from the image data of each area. Also, the processing time for restoring the picture image refers, for example, to the required time so that the image restoration unit 51 restores the picture image of each area and that the input image restoration unit 53 generates the picture image corresponding to the image data input to the MFP 1.

Moreover, the processing time for restoring the picture image may include the required time for reading the image data from the image data holding unit 91 or that for reading the layout information from the layout information holding unit 93.

Moreover, the processing time for restoring the picture image may be the time from when an operator or the like provides instructions for performing jobs to the input unit or the like (not shown) of the MFP 1 until when the screen according to the jobs is displayed on the display device controlled by either the display unit 20 or the PC 7.

Since the processing time for restoring the picture image differs according to the specification of the device that performs the processing, the format selection unit 43 selects the format of the image data depending on the processing performance of the device that restores the picture image. The format selection unit 43 reduces the processing time for restoring the picture image by selecting the format that reduces the amount of the image data.

FIG. 5 is a flowchart showing the processing example based on the description of FIG. 4. In step S101 of FIG. 5, the characteristics acquisition unit 42 divides the picture image of each area into blocks and applies the frequency decomposition to each block. Alternatively, the characteristics acquisition unit 42 may instruct the orthogonal transformation unit 61 to perform the processing of the frequency decomposition.

Step S101 is followed by step S102 where the characteristics acquisition unit 42 calculates the average of the transformation coefficients higher than the given order from among those of the respective blocks acquired in step S101 in the whole image.

Step S102 is followed by step S103 where the format selection unit 43 compares the average acquired in step S102 with the given threshold. Then, the process proceeds to either step S104 if the average is larger than the threshold or step S105 if not.

In step S104 following step S103, the format selection unit 43 selects the raster data format as the format of the image data corresponding to the picture image whose characteristics are acquired in steps S101 and S102.

In step S105 following step S103, on the other hand, the format selection unit 43 selects the vector data format as the format of the image data corresponding to the picture image whose characteristics are acquired in steps S101 and S102.

(Processing in Which Screen is Generated from Image Data Managed by Screen Management Section 90)

Figure 6:
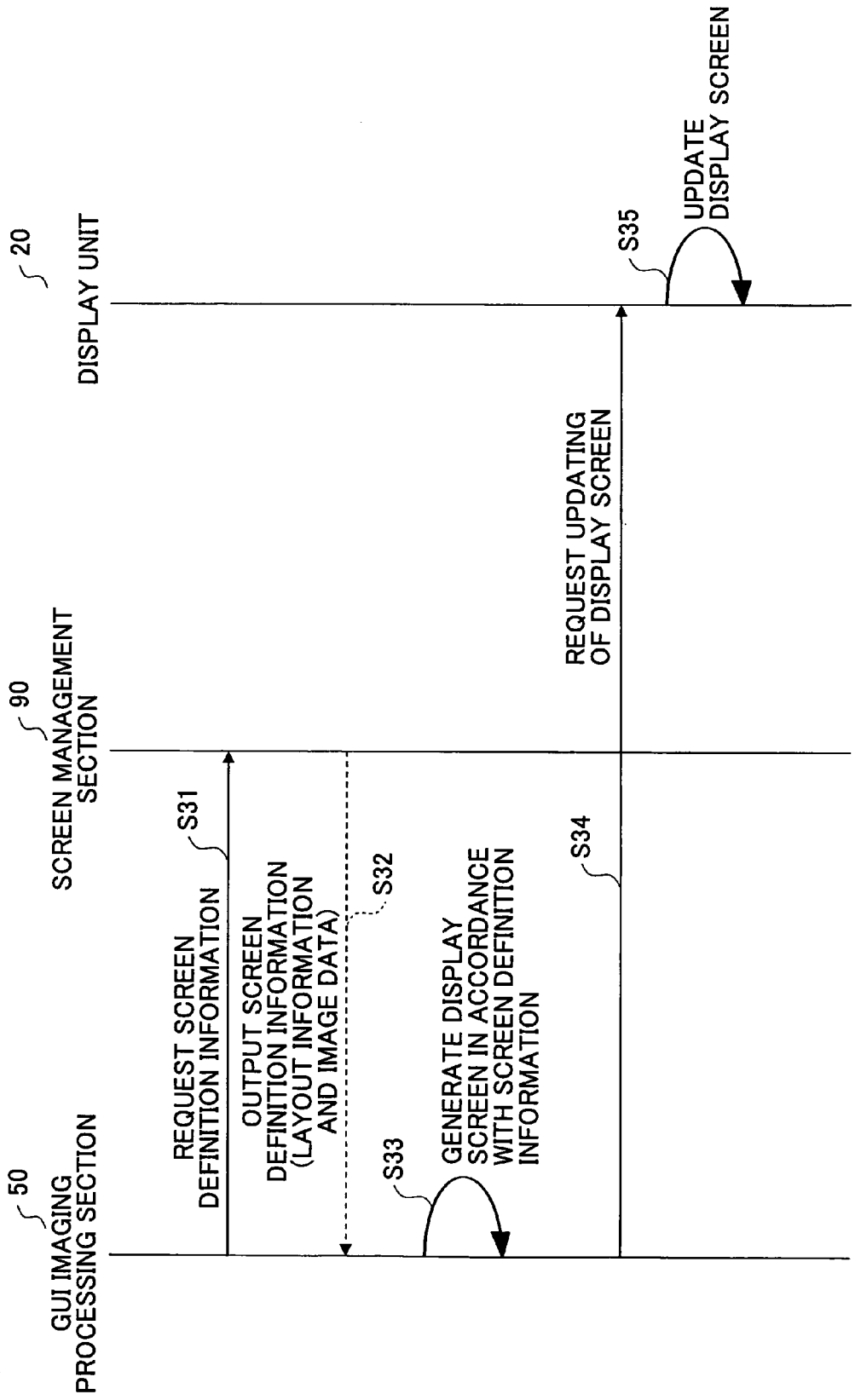
FIG. 6 is a sequence chart showing an example of processing in which a screen is generated by the image data or the like managed by the screen management section 90.

FIG. 6 is a sequence chart showing an example of processing in which the screen is generated by the image data managed by the screen management section 90. The image data managed by the screen management unit 90 include the layout information and the image data of each area acquired by the screen definition generation section 40.

In step S31 of FIG. 6, the GUI imaging processing section 50 requests the screen definition information from the screen management section 90. The GUI imaging processing section 50 may request the screen definition information from the screen definition management unit 95 of the screen management section 90.

Step S31 is followed by step S32 where the screen management section 90 outputs the screen definition information to the GUI imaging processing section 50. The screen definition information includes the layout information and the image data of each area. Alternatively, as the output of the screen definition information, the layout information holding unit 93 may output the layout information to the input image restoration unit 53, and the image data holding unit 91 may output the image data of each area to the image restoration unit 51.

Step S32 is followed by step S33 where the GUI imaging processing section 50 restores the picture image based on the screen definition information acquired in step S32. More specifically, the image restoration unit 51 of the GUI imaging processing section 50 restores the picture image of each area, and the input image restoration unit 53 restores the picture image input to the MFP 1 based on the layout information acquired in step S32 and the picture image of each area restored in step S33.

Step S33 is followed by step S34 where the GUI imaging processing section 50 requests the display unit 20 to display the screen as the picture image restored in step S33 and update the display screen. Step S34 is followed by step S35 where the display unit 20 updates the display screen by displaying the screen requested in step S34.

(Configuration of Computer)

Figure 7:
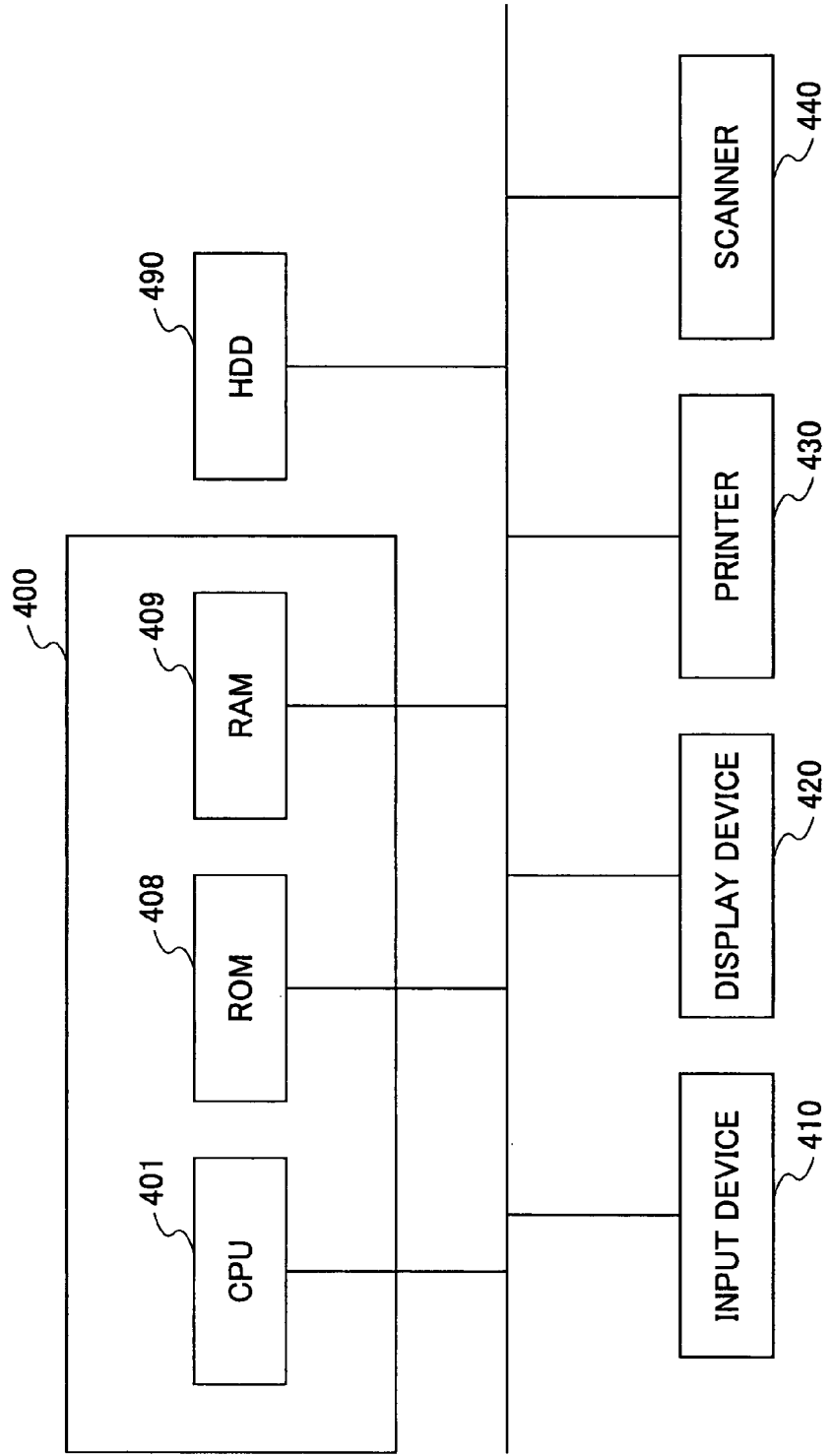
FIG. 7 is a block diagram of a computer that realizes the image processing apparatus of the present embodiment.

FIG. 7 is a block diagram of a computer that realizes the image processing apparatus of the present embodiment. The computer of FIG. 7 includes a main processing section 400, an input device 410, a display device 420, a printer 430, a scanner 440, and a HDD 490. The main processing section 400 is the main part that performs the functions of the computer and includes a CPU 401, a ROM 408, and a RAM 409. The CPU 401 executes the computer program according to the embodiment of the present invention by reading the computer program from the ROM 408 or the like and loading the same into the RAM 409. The ROM 408 is a nonvolatile memory and holds programs such as the computer program executed by the CPU 401, parameters required for controlling the image processing apparatus, and the like. The RAM 409 is a work memory used when the CPU 401 performs processing.

The input device 410 is a keyboard or the like used when an operator provides instructions. The display device 420 displays the status of the computer. The printer 430 is an apparatus that forms images on a medium to be output, and the scanner 440 is an apparatus that optically scans the images formed on the medium. The HDD 490 stores large volumes of data such as data of images.

The computer program of the embodiment of the present invention may be stored not only in the HDD 490 or the ROM 408 but also in a recording medium capable of being inserted in other drive units (not shown).

The present invention is not limited to the specifically disclosed embodiments, and variations and modifications may be made without departing from the scope of the present invention.

The present application is based on Japanese Priority Patent Application No. 2006-346078, filed on Dec. 22, 2006, the entire contents of which are hereby incorporated by reference.

What is claimed is:

1. An image processing apparatus comprising:
   a characteristics acquisition unit to acquire transformation coefficients generated by an orthogonal transformation process of a picture image;
   a format selection unit to select either a raster data format or a vector data format by comparing an average of the transformation coefficients with a given threshold; and
   a format conversion unit to convert the format of the image data into the format selected by the format selection unit.

2. The image processing apparatus according to claim 1, further comprising:
   an image generation unit to generate the picture image from input image data; and
   an image division unit to divide the picture image into plural areas based on characteristics of the picture image; wherein
   the characteristics acquisition unit acquires the transformation coefficients of the picture image of each of the areas,
   the format selection unit selects the format of the image data for each of the areas, and
   the format conversion unit converts the format of the image data for each of the areas.

3. The image processing apparatus according to claim 2, wherein
   the image division unit acquires layout information of the picture image corresponding to the input image data,
   the image processing apparatus further comprising:
   a layout information holding unit to hold the layout information;
   an image-data holding unit to hold the image data of each of the areas converted by the format conversion unit;
   an image restoration unit to restore the picture image of each of the areas from the image data held by the image data holding unit; and
   an input image restoration unit to restore the picture image corresponding to the input image data based on the picture image of each of the areas and the layout information.

4. The image processing apparatus according to claim 3, further comprising
   a display unit to display the picture image restored by the input image restoration unit.

5. The image processing apparatus according to claim 1, further comprising
   an orthogonal transformation unit to apply orthogonal transformation to the picture image; wherein
   the format selection unit selects the raster data format if the average of the transformation coefficients generated by the orthogonal transformation unit is larger than the threshold and selects the vector data format if the average is equal to or smaller than the threshold.

6. The image processing apparatus according to claim 5, wherein
   the orthogonal transformation unit applies the orthogonal transformation to each of plural blocks in the picture image divided into the blocks, and
   the format selection unit selects the raster data format if an average of the transformation coefficients higher than a given order from among the transformation coefficients of the blocks is larger than the threshold and selects the vector data format if the average is equal to or smaller than the threshold.

7. The image processing apparatus according to claim 6, further comprising
   a compression unit to compress the image data based on the transformation coefficients generated by the orthogonal transformation unit.

8. An image processing method comprising:
   a characteristics acquisition step of acquiring transformation coefficients generated by an orthogonal transformation process of a picture image;
   a format selection step of selecting either a raster data format or a vector data format by comparing an average of the transformation coefficients with a given threshold; and
   a format conversion step of converting the format of the image data into the format selected in the format selection step.

9. The image processing method according to claim 8, further comprising:
   an image generation step of generating the picture image from input image data; and
   an image division step of dividing the picture image into plural areas based on characteristics of the picture image; wherein
   the transformation coefficients of the picture image of each of the areas are acquired in the characteristics acquisition step,
   the format of the image data for each of the areas is selected in the format selection step, and
   the format of the image data for each of the areas is converted in the format conversion step.

10. The image processing method according to claim 9, wherein
    layout information of the picture image corresponding to the input image data is acquired in the image division step,
    the image processing method further comprising:
    an image restoration step of restoring the picture image of each of the areas from the image data of the corresponding area converted in the format conversion step; and
    an input image restoration step of restoring the picture image corresponding to the input image data based on the picture image of each of the areas and the layout information.

11. The image processing method according to claim 10, further comprising
  a display step of displaying the picture image restored in the input image restoration step.

12. The image processing method according to claim 8, further comprising
  an orthogonal transformation step of applying orthogonal transformation to the picture image; wherein,
  in the format selection step, the raster data format is selected if the average of transformation coefficients generated in the orthogonal transformation step is larger than the threshold and the vector data format is selected if the average is equal to or smaller than the threshold.

13. The image processing method according to claim 12, wherein
  the orthogonal transformation is applied to each of plural blocks in the picture image divided into the blocks in the orthogonal transformation step, and
  the format of the image data is selected to be raster data format if an average of the transformation coefficients higher than a given order from among the transformation coefficients of the blocks is larger than the threshold and the vector data format is selected if the average is equal to or smaller than the threshold.

14. The image processing method according to claim 12, further comprising
  a compression step of compressing the image data based on the transformation coefficients generated in the orthogonal transformation step.

15. A non-transitory computer readable medium storing a program for performing the image processing method according to claim 8.

* * * * *